US010512805B2

(12) United States Patent
Damazo et al.

(10) Patent No.: US 10,512,805 B2
(45) Date of Patent: *Dec. 24, 2019

(54) IGNITION-QUENCHING SYSTEMS, APPARATUSES, AND METHODS

(71) Applicant: The Boeing Company, Huntington Beach, CA (US)

(72) Inventors: Jason Scott Damazo, Seattle, WA (US); Eddie Kwon, Seattle, WA (US); Arthur C. Day, Seattle, WA (US); John Rubrecht Lowell, Fairfax, VA (US)

(73) Assignee: The Boeing Company, Chicago, IL (US)

( * ) Notice: Subject to any disclaimer, the term of this patent is extended or adjusted under 35 U.S.C. 154(b) by 422 days.

This patent is subject to a terminal disclaimer.

(21) Appl. No.: 14/805,259

(22) Filed: Jul. 21, 2015

(65) Prior Publication Data

US 2017/0021209 A1    Jan. 26, 2017

(51) Int. Cl.
| | |
|---|---|
| A62C 2/06 | (2006.01) |
| A62C 3/06 | (2006.01) |
| A62C 3/07 | (2006.01) |
| A62C 3/08 | (2006.01) |
| A62C 4/00 | (2006.01) |
| B64D 37/32 | (2006.01) |

(52) U.S. Cl.
CPC .......... *A62C 3/07* (2013.01); *A62C 2/06* (2013.01); *A62C 3/065* (2013.01)

(58) Field of Classification Search
CPC .... A62C 3/07; A62C 2/06; A62C 3/06; A62C 3/065; A62C 3/08; A62C 4/00; B64D 37/32; Y02T 50/44

USPC .......................... 169/48–50, 62, 66
See application file for complete search history.

(56) References Cited

U.S. PATENT DOCUMENTS

| | | |
|---|---|---|
| 1,673,486 A | 6/1928 | Berge |
| 3,485,134 A | 12/1969 | Ott |
| 3,699,368 A | 10/1972 | Palmer |
| 3,969,786 A | 7/1976 | Peak |

(Continued)

OTHER PUBLICATIONS

European Patent Office, Extended European Search Report for foreign counterpart European Patent Application No. EP 16173069, dated Nov. 17, 2016.

(Continued)

*Primary Examiner* — Christopher S Kim
(74) *Attorney, Agent, or Firm* — Dascenzo Intellectual Property Law, P.C.

(57) ABSTRACT

Ignition-quenching systems include an ignition-risk structure that extends from a support structure into a combustible environment and include a porous ignition-quenching cover that substantially covers the ignition-risk structure. The ignition-quenching cover is configured to quench an ignition event triggered by an ignition source associated with the ignition-risk structure. Ignition-quenching covers generally include a porous body. The porous body may include one or more porous elements. Methods according to the present disclosure include installing a porous ignition-quenching cover over an ignition-risk structure to prevent bulk combustion, e.g., of a fuel vapor in a fuel tank, due to an ignition event associated with the ignition-risk structure.

32 Claims, 2 Drawing Sheets

(56) References Cited

U.S. PATENT DOCUMENTS

| | | |
|---|---|---|
| 4,013,190 A | 3/1977 | Wiggins et al. |
| 4,129,060 A | 12/1978 | Gould |
| 4,519,974 A | 5/1985 | Bravenec et al. |
| 4,636,446 A | 1/1987 | Lee |
| 4,820,097 A | 4/1989 | Maeda et al. |
| 4,826,380 A | 5/1989 | Henry |
| 4,923,348 A | 5/1990 | Carlozzo et al. |
| 5,108,853 A | 4/1992 | Feres |
| 6,102,128 A * | 8/2000 | Bridgeman ............ A62C 8/06 169/49 |
| 7,134,666 B2 | 11/2006 | Beyssac et al. |
| 7,584,582 B1 | 9/2009 | Hutter, III |
| 7,878,747 B2 | 2/2011 | Dean et al. |
| 7,918,081 B2 * | 4/2011 | Schlichting ............ F02C 6/08 169/48 |
| 8,717,735 B2 | 5/2014 | Day et al. |
| 8,717,736 B2 | 5/2014 | Asahara et al. |
| 8,840,740 B2 | 9/2014 | Rorabaugh et al. |
| 8,894,338 B2 | 11/2014 | Dobbin et al. |
| 9,188,226 B2 | 11/2015 | Pajel et al. |
| 9,951,804 B2 | 4/2018 | Dobbin et al. |
| 2008/0137259 A1 | 6/2008 | Heeter et al. |
| 2009/0194297 A1 * | 8/2009 | Ortiz Teruel ............ A62C 2/10 169/50 |
| 2013/0206759 A1 | 8/2013 | Wuertz et al. |
| 2015/0060465 A1 | 3/2015 | Limbacher et al. |
| 2015/0082603 A1 | 3/2015 | Rawdon et al. |
| 2015/0086295 A1 | 3/2015 | Cameron et al. |
| 2015/0182899 A1 | 7/2015 | Bansal et al. |
| 2015/0184688 A1 | 7/2015 | Dobbin et al. |
| 2017/0008636 A1 | 1/2017 | Gaw |

OTHER PUBLICATIONS

"Customized Sealant Solutions: PRC® Seal Caps," PPG Aerospace, product literature downloaded from ppgaerospace.com on Sep. 7, 2016.

"Porex® Battery Vents—Flame Arrestors," Porex Corporation, product literature, downloaded from porex.com on Apr. 3, 2017.

Product literature for ERG Duocel aluminum foam, downloaded from ERG Aerospace website, www.ergaerospace.com/literature/erg_duocel.pdf, Jul. 9, 2015.

"HRL Researchers Develop World's Lightest Material," downloaded from HRL Laboratories website, www hrl.com/hrlDocs/pressreleases/2011/prsRls_111117, Jul. 10, 2015.

* cited by examiner

IGNITION-QUENCHING SYSTEMS, APPARATUSES, AND METHODS

FIELD

The present disclosure relates to systems, apparatuses, and methods for quenching ignition.

BACKGROUND

In many situations, devices must operate in potentially hazardous conditions, such as where a fuel mixture may be ignited by uncontrolled operating or environmental conditions. For example, vehicles, including aerospace vehicles, typically operate with a fuel that must be maintained in a safe condition during storage and use. The ignition hazard should be minimized even when the vehicle is subject to uncontrolled events such as an accident, electrical malfunction, a lightning strike, or static electrical discharge. Other applications requiring ignition hazard consideration include fuel transport, fuel storage, mining operations, chemical processing, metal fabrication, power plant construction and operation, and operations which involve combustible particulate such as sawdust, metal, flour, and grain.

In the aerospace industry, lightning strikes of aircraft are a concern because they could result in electrical arcs and/or heating sufficient to ignite vaporous fuel mixtures. Though lightning passes through aircraft virtually always without resulting harm, newer aircraft designs incorporating composite materials include less metal to shunt and/or dissipate the energy of a lightning strike.

Design of apparatuses exposed to ignition hazards typically involves reducing the likelihood of ignition, containing the ignition hazard, and/or withstanding the ignition hazard. Electrically conductive structures, such as fasteners, may join and/or support composite structural components within potentially combustible environments, such as within a fuel tank. These electrically conductive structures may become a focal point for electromagnetic effects (e.g., arcing, electrostatic discharge, heating, and/or hot particle ejection), e.g., due to lightning strikes.

Conventionally, metal fasteners in a composite fuel tank are isolated from the fuel volume by sealant and/or a seal cap. The sealant and/or seal cap are configured to physically and/or electrically separate the metal fastener from the fuel volume and to contain the ignition hazard. However, electromagnetic effects may generate heat and pressure transients that may damage the seal. Additionally, seals may be subject to temperature cycles due to, e.g., daily solar heating and/or operation in the atmosphere. The temperature cycling may lead to increased susceptibility to damage from electromagnetic effects and/or ignition events.

SUMMARY

Ignition-quenching systems include an ignition-risk structure that extends from a support structure into a combustible environment and include a porous ignition-quenching cover that substantially covers the ignition-risk structure. The ignition-quenching cover is configured to quench an ignition event triggered by an ignition source associated with the ignition-risk structure. Ignition-quenching covers generally include a porous body. The porous body may include one or more porous elements. Methods according to the present disclosure include installing a porous ignition-quenching cover over an ignition-risk structure to prevent bulk combustion, e.g., of a fuel vapor in a fuel tank, due to an ignition event associated with the ignition-risk structure.

DESCRIPTION

Figure 1:
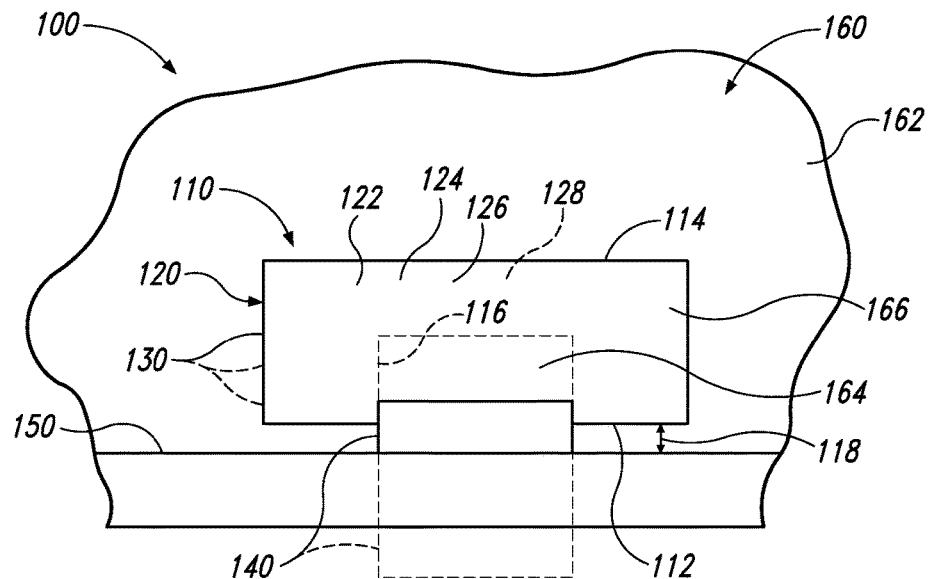
FIG. 1 is a fragmentary side elevation representation of an ignition-quenching system.

FIGS. 1-5 provide examples of systems, apparatuses, and methods for quenching ignition. In general, in the drawings, elements that are likely to be included in a given embodiment are illustrated in solid lines, while elements that are optional or alternatives are illustrated in dashed lines. However, elements that are illustrated in solid lines are not essential to all embodiments of the present disclosure, and an element shown in solid lines may be omitted from a particular embodiment without departing from the scope of the present disclosure. Elements that serve a similar, or at least substantially similar, purpose are labeled with numbers consistent among the figures. Like numbers in each of the figures, and the corresponding elements, may not be discussed in detail herein with reference to each of the figures. Similarly, all elements may not be labeled or shown in each of the figures, but reference numerals associated therewith may be used for consistency. Elements, components, and/or features that are discussed with reference to one or more of the figures may be included in and/or used with any of the figures without departing from the scope of the present disclosure.

FIG. 1 is a schematic representation of an ignition-quenching system 100 that includes an ignition-quenching cover 110. The ignition-quenching cover 110 (also called an ignition arrestor) covers an ignition-risk structure 140 that extends and/or protrudes from a support structure 150. The ignition-risk structure 140 is a structure associated with a potential ignition source, e.g., a fastener potentially subject to electromagnetic effects that may produce arcing at the fastener.

Ignition-quenching systems 100 may include a combustible environment 160. Additionally or alternatively, ignition-quenching system 100, and/or components thereof, may be configured for contact and/or utilization with the combustible environment 160 (e.g., chemically resistant to and/or chemically nonreactive with combustible environment 160). Combustible environment 160 is combustible and includes a combustible substance and/or mixture. For example, combustible environment 160 may include a fuel (e.g., hydrogen, gaseous, liquid, and/or aerosolized hydrocarbon, and/or suspended particulate such as sawdust, etc.), an oxidizer (e.g., oxygen, fluorine, and/or nitrous oxide), and optional non-reactive diluent (e.g., nitrogen, argon, and/or helium) with concentrations within the flammability limits of the fuel/oxidizer mixture. As another example, combustible environment 160 may include a gas that undergoes explosive decomposition (e.g., acetylene, nitrous oxide).

Additional specific examples of fuels include motor fuels such as automotive fuel, diesel fuel, aviation fuel, and/or jet fuel. Combustible environment 160 may include gases, vapors, aerosols, and/or particulate.

Ignition-quenching cover 110 has a proximal cover side 112 and a distal cover side 114. The proximal cover side 112 is configured to face the ignition-risk structure 140 and the support structure 150. The proximal cover side 112 may be referred to as the interior surface of the ignition-quenching cover 110. The distal cover side 114 is opposite the proximal cover side 112. The distal cover side 114 is configured to face towards a bulk 162 of the combustible environment 160 and to face generally away from the ignition-risk structure 140 and the support structure 150. Distal cover side 114 may be referred to as the exterior surface of the ignition-quenching cover 110.

Ignition-quenching cover 110 is porous, permitting the combustible environment 160 to permeate into and through the ignition-quenching cover 110 and to contact the ignition-risk structure 140. Ignition-quenching cover 110 includes, and may be essentially composed of, a porous body 120 that is configured to permit the combustible environment 160 to permeate into and through the porous body 120. The bulk 162 of the combustible environment 160 is the portion of the combustible environment 160 not within the ignition-quenching cover 110 and not enclosed by the ignition-quenching cover 110 between the proximal cover side 112 and the ignition-risk structure 140 and/or the support structure 150. The volume between the proximal cover side 112 and the ignition-risk structure 140 and/or the support structure 150 is an enclosed volume 164 of the ignition-quenching cover 110. The volume within the ignition-quenching cover 110 (e.g., the volume between the proximal cover side 112 and the distal cover side 114) that is accessible to the combustible environment 160 is an interior volume 166 of the ignition-quenching cover 110 (also referred to as the pore volume). The enclosed volume 164 and the interior volume 166 are substantially less than the volume of the bulk 162 of the combustible environment 160.

Ignition-quenching cover 110 is configured to prevent an ignition source originating from the ignition-risk structure 140 (e.g., due to electromagnetic effects) from igniting the bulk 162 of the combustible environment 160. That is, an ignition source confined by the ignition-quenching cover 110 is prevented from producing substantial and/or undesirable combustion (e.g., explosive combustion) in the bulk 162 of the combustible environment 160. Examples of ignition sources include an electrical arc, a hot surface, a hot particle ejection, and/or an electrostatic discharge (e.g., due to internal friction and/or tribocharging).

Without the ignition-quenching cover 110, an ignition source within the combustible environment 160 would generate an ignition kernel (a small volume of combustion initiated by the energy imparted by the ignition source). Typically, but not necessarily, an ignition source would create a region of energetic gas that has high pressure and high temperature over a time scale during which the gas is essentially not moving (i.e., the energy deposition from the ignition source would be essentially impulsive). Due to this energy deposition, the energetic gas will expand into the surrounding gas that had been unaffected by the energy deposition. The sudden expansion of the energetic gas creates a pressure wave which may be acoustic or supersonic. If the pressure wave is sufficiently energetic, it may cause direct ignition of the combustion reactants (e.g., detonation).

The ignition-quenching cover 110 generally is configured to quench ignition from an ignition source that does not pose a direct ignition risk due to the associated pressure wave. For example, typical ignition sources to be mitigated by the ignition-quenching cover 110 impart less than 1 J (joules) or less than 0.1 J (and typically more than 1 µJ (microjoules) or more than 10 µJ). Such lower energy ignition sources may generate weak shock waves and/or pressure waves with a pressure amplitude less than about 100 kPa (kilopascals). Further, ignition-quenching cover 110 may be configured to withstand a pressure wave (if any) generated by an ignition source enclosed by the ignition-quenching cover 110, for example, by being porous enough to permit gas pressure equalization across the ignition-quenching cover 110. The ignition-quenching cover 110 may be configured to impede and/or dissipate the pressure wave and may be configured to permit the pressure wave to pass substantially unimpeded.

Without the ignition-quenching cover 110, the ignition kernel would generate hot gases and/or hot particles that are a direct ignition risk. These reaction products may drive a self-propagating combustion reaction (an established flame front, e.g., a deflagration wave or detonation wave) that would consume all of the available combustion reactants. Flame arrestors may be placed in the path of the established flame front to limit the propagation of the flame front. For example, flame arrestors may be placed in fuel fill tubes to prevent an established flame front from propagating through the fuel fill tube. Flame arrestors typically are installed in a transfer path, such as a fill tube, a pour spout, and/or conduit, and therefore are configured to permit flow of gas and liquid substantially unimpeded.

Ignition-quenching cover 110 is configured to prevent the formation of an ignition kernel due to an ignition source and/or to prevent propagation of a nascent flame front originating from the ignition kernel. That is, the ignition-quenching cover 110 may be configured to prevent ignition of the combustible environment 160 within the enclosed volume 164 and may be configured to quench and/or extinguish ignition within and/or in proximity to the ignition-quenching cover 110 (e.g., within the enclosed volume 164 and/or the interior volume 166). Thus, if an ignition source does ignite an ignition kernel within the enclosed volume 164, the nascent flame front generated by the ignition kernel does not pass through and/or around the ignition-quenching cover 110. The nascent flame front is quenched before the nascent flame front could contact the bulk 162 of the combustible environment 160 and establish a self-propagating flame front. Together, the ignition kernel, the associated nascent flame front, and the associated pressure wave within the enclosed volume 164 may be referred to as an ignition event. The ignition-quenching cover 110 is configured to prevent, mitigate, and/or suppress one or more aspects of an ignition event triggered (ignited) by an ignition source associated with the ignition-risk structure 140.

Because the ignition-quenching cover 110 is configured to quench, extinguish, and/or suppress combustion (an ignition event) within and/or in proximity to the ignition-quenching cover 110, the ignition-quenching cover 110 does not need to quench an established flame front like a deflagration wave. By preventing further combustion when the combusted region is small, the requirements to withstand heat and/or pressure are likewise small, as compared to the requirements to stop an established flame front. Similarly, the potential combusted volume of the combustible environment 160 is smaller if combustion is stopped at the source rather than at a distant location in the path of the established flame front.

Ignition-quenching cover 110 may be configured to prevent formation, propagation, and/or maturation of an ignition kernel therein by dissipating heat energy associated with the ignition source and/or the ignition kernel. An ignition kernel may mature into a self-propagating combustion reaction (e.g., a deflagration wave) when heat energy from the reaction sufficiently heats neighboring combustion reactants (i.e., when energy released is greater than energy losses). Ignition-quenching cover 110 may be configured to dissipate heat energy that may otherwise serve to sustain a combustion reaction. For example, the porous body 120 may have a surface area to pore volume ratio that is high enough to prevent combustion from propagating through the porous body 120 because of the thermal contact between the porous body 120 and the combustible environment 160 within the porous body 120.

Porous body 120 and/or ignition-quenching cover 110 may have a specific heat capacity that is greater, typically much greater, than the specific heat capacity of combustible environment 160. For example, the porous body 120, and/or components thereof, may have a volumetric specific heat capacity that is at least 10 times, at least 100 times, or at least 1,000 times the volumetric specific heat capacity of the combustible environment 160. Porous body 120 and/or ignition-quenching cover 110 may have a total heat capacity that is greater, typically much greater, than the total heat capacity of combustible environment 160 within the volume defined by the exterior dimensions of the corresponding porous body 120 and/or ignition-quenching cover 110. For example, the porous body 120, and/or components thereof, may have a total heat capacity that is at least 3 times, at least 10 times, or at least 30 times the total heat capacity of the combustible environment 160 within the volume defined by the exterior dimensions of the porous body 120. Porous body 120 of ignition-quenching cover 110 may have a thermal conductivity that is greater, typically much greater, than the thermal conductivity of combustible environment 160. For example, the porous body 120, and/or components thereof, may have a thermal conductivity that is at least 5 times, at least 10 times, at least 100 times, or at least 1,000 times the thermal conductivity of the combustible environment 160. As a specific comparison, air and combustible gases have a volumetric specific heat capacity of about 1 kJ/(m$^3$·K) (kilojoules per meter-cubed kelvin) and a thermal conductivity of about 0.03 W/(m·K) (watts per meter kelvin), while the comparable values for examples of ignition-quenching cover 110 materials are 2,400 kJ/(m$^3$·K) and 170 W/(m·K) (for aluminum), and 2,000 kJ/(m$^3$·K) and 0.25 W/(m·K) (for polyamide 6/6, also sold as NYLON 6/6 polymer).

Ignition-quenching cover 110 may be configured to prevent the ignition of combustible environment 160 by preventing a hot particle that is emitted from ignition-risk structure 140 from traveling through the ignition-quenching cover 110 and/or the porous body 120. As used herein, the term "hot particle" refers to a particle that is emitted from ignition-risk structure 140 and/or due to an ignition source at the ignition-risk structure 140 that has a size and/or a thermal energy sufficient to cause ignition of combustible environment 160. Porous body 120 and/or ignition-quenching cover 110 may be configured such that no particle larger than a predetermined size may fully pass through porous body 120 along a straight-line trajectory without colliding with a structural element of porous body 120 and thereby losing at least a portion of its thermal and/or kinetic energy. For example, and as discussed further herein, porous body 120 may be constructed of one or more foams and/or lattices that lack a straight-line open path connecting proximal cover side 112 and distal cover side 114 that would allow unimpeded transit of a particle greater than a predetermined size.

Figure 2:
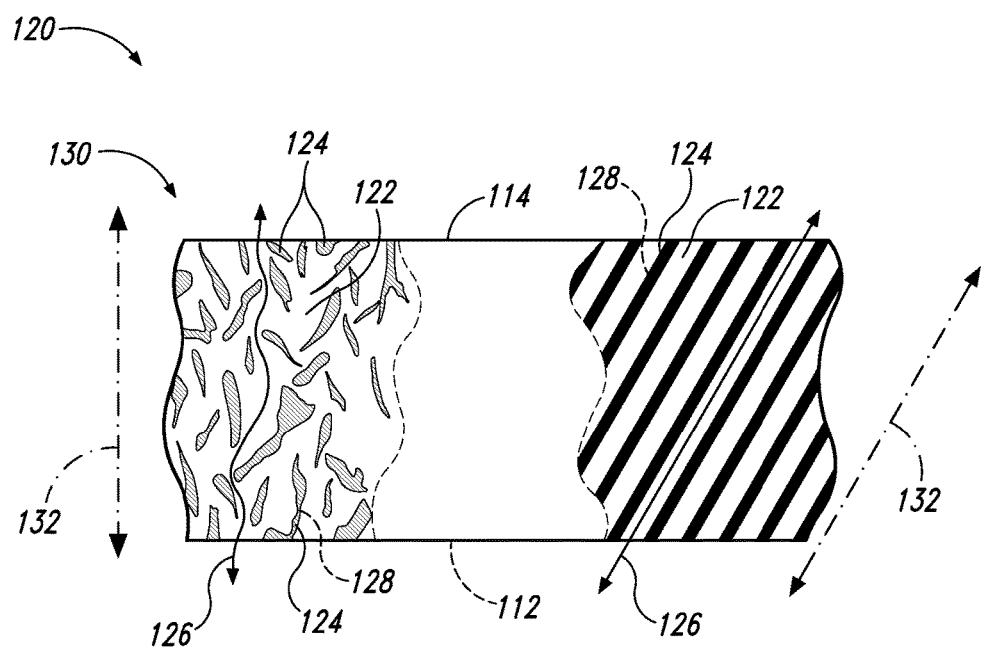
FIG. 2 is a fragmentary view of an example of a porous body.

A combustible substance in a given set of environmental conditions may be characterized by a quenching distance that is defined as the smallest diameter of a tube through which a flame front in the combustible substance may propagate. Porous body 120 includes pores 122 and/or passages 126 (as best seen in the examples of FIG. 2) that are sized and/or arranged to prevent a nascent flame front from passing through ignition-quenching cover 110. For instance, a characteristic pore size and/or a characteristic passage size of porous body 120, as discussed in more detail herein, may be smaller than a quenching distance, or related parameter, of combustible environment 160, such that an ignition kernel and/or a nascent flame front that originates at ignition-risk structure 140 (e.g., within enclosed volume 164) is quenched within the interior volume 166 before the ignition kernel and/or the flame front may reach distal cover side 114.

Porous body 120 includes, and may be composed essentially of, one or more porous elements 130. As detailed in the example internal views of FIG. 2, porous body 120 and porous elements 130 each include a plurality of pores 122 (also called cells) and a plurality of struts 124 (also called trusses and/or ligaments) that together form a mesh, a network, a lattice, a matrix, and/or a foam structure. Struts 124 are structural components that adjoin and/or define pores 122. Examples of struts include beam-like structural elements of a lattice structure, cell faces of a foam, and cell edges of a foam. The structure of the porous body 120 and/or the porous elements 130 may be ordered, disordered, or may include regions of order and/or disorder. Hence, the pores 122 and/or the struts 124 of the porous body 120 may be described as ordered, disordered, regular, irregular, patterned, repetitive, random, and/or chaotic. The left internal view of FIG. 2 shows an example of a relatively disordered pore 122 and strut 124 network, with a distribution of pores 122 and struts 124 in an irregular pattern. The right internal view of FIG. 2 shows an example of a relatively ordered pore 122 and strut 124 network, with relatively uniformly sized and spaced pores 122 and struts 124.

The pores 122 (of porous body 120 and porous elements 130) generally are interconnected and form passages 126 (also called channels) that permit gas and/or liquid flow through the porous body 120. Hence, porous body 120 and porous elements 130 may be described as gas permeable and/or liquid permeable. The porous body 120 may be configured to have significant flow resistance to gas flow and/or liquid flow (such as flow of liquid fuel) provided that the flow resistance is sufficiently low enough to withstand a pressure wave associated with an ignition source. Alternatively, the porous body 120 may be configured to have a relatively low resistance to gas flow through the porous body 120; gas may flow substantially freely through the porous body 120 and a pressure wave would be substantially unimpeded. Porous body 120 and/or porous elements 130 may include, and/or may be, a reticulated lattice, a reticulated foam, and an open-cell foam.

Porous body 120 and/or porous elements 130 may be characterized by the sizes of the respective pores 122 (such as the volumes, areas, and/or effective diameters of pores 122), the sizes of the respective struts 124 (such as volumes, cross sectional areas, and/or lengths of struts 124), and/or characteristics of the passages 126 (such as average effective diameter, spacing, density, and/or average orientation of the passages 126). Pores 122 and/or struts 124 within a porous structure (porous body 120 or porous elements 130) may be approximately equal in size (e.g., all pores 122 substantially the same size) and may have a distribution of sizes. For example, porous body 120 and/or porous elements 130 may be characterized by a minimum pore size, a maximum pore size, an average (i.e., a mean) pore size, a standard deviation of pore sizes, a distribution of pore sizes, and/or any other suitable metric. As another example, porous body 120 and/or porous elements 130 may be characterized by a minimum, maximum, and/or average characteristic size of the passages 126 (e.g., the effective diameter of each passage 126). Generally, the effective diameters of the pores 122 and/or passages 126 of the porous body 120 are less than the quenching distance of the combustible environment 160 and sized to permit a pressure wave associated with an ignition event to flow through the porous body 120 and/or to dissipate within the porous body 120. As discussed herein, the maximum effective diameter of pores 122 and/or the maximum effective diameter of passages 126 of individual porous elements 130 may be larger than the quenching distance of the combustible environment 160. Within the porous body 120 and/or the porous elements 130, the average effective diameter of pores 122 and/or the average effective diameter of passages 126 may be at least 0.1 mm (millimeters), at least 0.2 mm, at least 0.5 mm, at least 1 mm, at least 2 mm, at least 3 mm, at most 10 mm, at most 3 mm, at most 1 mm, at most 0.3 mm, and/or at most 0.1 mm. Struts 124 may have an average diameter that is at most 75%, at most 50%, at most 25%, at most 10%, and/or at most 5% of the average effective diameter of the respective pores 122 and/or passages 126.

Ignition-quenching cover 110 and/or porous body 120 may have a mass density that is less, typically much less, than the mass density of the materials that form the respective ignition-quenching cover 110 or porous body 120. The mass density of ignition-quenching cover 110 and/or porous body 120 is the mass of the respective structure divided by the exterior volume of the respective structure (the volume defined by the exterior dimensions of the structure). The exterior volume of the respective structure includes the open pore volume and any enclosed voids of the structure. For example, the exterior volume of the ignition-quenching cover 110 is the volume defined by the proximal cover side 112 and the distal cover side 114 and includes the interior volume 166, but not the volume of an optional cavity 116 (as discussed further herein). Ignition-quenching cover 110 and/or porous body 120 may have a mass density that is at most 2 g/cc (grams per cubic centimeter), at most 1 g/cc, at most 0.5 g/cc, at most 0.2 g/cc, at most 0.1 g/cc, at most 0.05 g/cc, at most 0.02 g/cc, or at most 0.01 g/cc.

Ignition-quenching cover 110 and/or porous body 120 may be characterized by a porosity. The porosity of ignition-quenching cover 110 and/or porous body 120 is the total open volume of the pores 122 (e.g., the interior volume 166) divided by the exterior volume of the respective structure. The porosity of the respective structure may be described as the volume fraction of the pores 122 and/or the volume fraction not occupied by the struts 124 or other structural elements. The porosity of the ignition-quenching cover 110 and/or the porous body 120 may be at least 50%, at least 75%, at least 85%, at least 90%, at least 95%, and at least 98%.

Struts 124 of porous body 120 and/or porous elements 130 may include one or more hollow struts 128. Hollow struts 128 may be hollow and may include open or closed voids (for instance, one or more hollow struts 128 may be hollow tubes). The internal voids of one or more struts 124 may be interconnected. The majority of, or all, struts 124 may be hollow struts 128. Hollow struts 128 may be sized to reduce the weight of porous body 120 and/or porous elements 130, while maintaining the structural integrity of the respective structure, relative to a similar porous structure incorporating solid struts. Hollow struts 128 may be configured to rupture responsive to a force greater than a predetermined threshold magnitude, such as a force that may be associated with a pressure wave associated with an ignition event. The hollow struts 128 may contain an inert gas or a flame-suppressing substance such as a haloalkane. In such an embodiment, the rupturing of hollow strut 128 as a result of an ignition event associated with the ignition-risk structure 140 may release the flame-suppressing substance, which may serve to mitigate the propagation of the ignition kernel and corresponding nascent flame front and/or quench the ignition event entirely.

Figure 3:
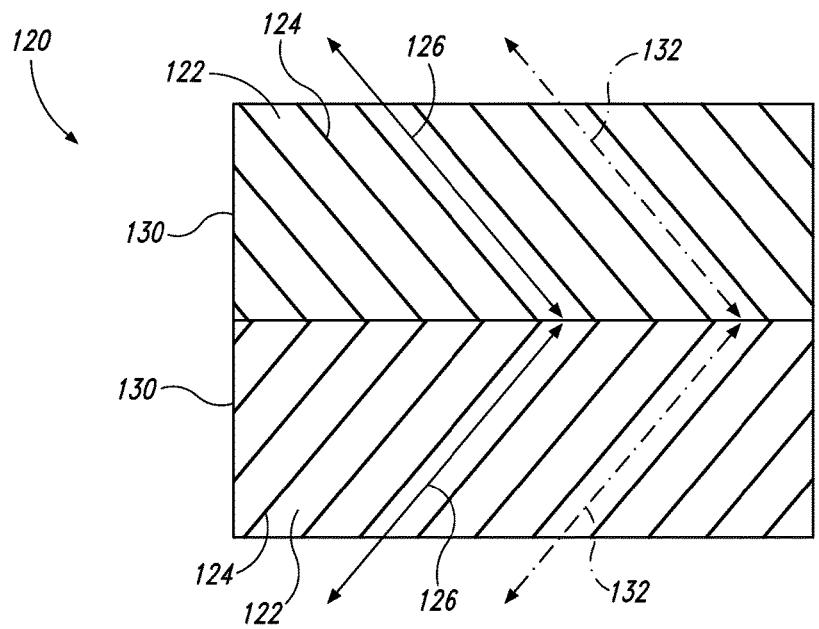
FIG. 3 is a fragmentary view of an example of a multi-component porous body.

As shown in the example of FIG. 3, porous body 120 may be a multicomponent structure (e.g., a multilayer structure) that includes two, three, four, or more porous elements 130. Each porous element 130 independently may have a passage orientation 132, an average passage size, an average pore size, an average passage spacing, and/or a passage density. For example, one porous element 130 may have one or more characteristics that are different than the corresponding characteristics of another porous element 130 within the same porous body 120. Additionally or alternatively, porous body 120 may include one or more porous elements 130 and a flexible exterior layer that is configured to elastically deform in response to a pressure wave associated with an ignition event. The flexible exterior layer may or may not be porous.

Passage orientation 132 may be defined by an average direction of passages 132 through the porous element 130 and/or by an average direction between opposite faces of the porous element 130 (e.g., proximal and distal faces of the porous element corresponding to the proximal cover side 112 and the distal cover side 114 of the ignition-quenching cover 110). In the example of FIG. 3, each porous element 130 has a different passage orientation 132, each defined by an ordered array of pores 122 and struts 124 (e.g., each porous element 130 is a regular lattice of struts 124).

By selecting and/or arranging the passage orientation 132, the average passage size, the average pore size, the average passage spacing, and/or the passage density of each porous element 130 and/or by selecting and/or arranging the relative alignment of the porous elements 130, the porous body 120 may be configured to have a maximum (and/or an average) passage size, pore size, and/or passage spacing less than a predetermined threshold, such as the quenching distance, or a related parameter, of the combustible environment 160. Similarly, porous body 120 may be configured to have a minimum and/or average passage density greater than a predetermined threshold, such as a parameter related to the quenching distance of the combustible environment 160. Though porous body 120 is configured to quench ignition within the combustible environment 160, individual porous elements 130 may have characteristics insufficient to quench ignition within the combustible environment 160.

The passage orientation 132, the average passage size, the average pore size, the average passage spacing, and/or the passage density of each porous element 130 of the porous body 120 may be selected and/or arranged to prevent the passage of a hot particle larger than a predetermined size. For example, the porous elements 130 of the porous body 120 may be aligned (by rotation and/or translation) such that the number and/or size of straight-line passages 126 through the porous body 120 are reduced with respect to the number and/or size of straight-line passages 126 through any of the porous elements 130. For example, and as shown in the example of FIG. 3, two otherwise identical porous elements 130 that are characterized by a regular lattice may be joined into a porous body 120 with each porous element 130 having a unique passage orientation 132 (and/or lattice orientation). Each porous element 130 individually has straight-line passages 126 through the respective porous element 130. However, the combination of porous elements 130 at different passage orientations 132 results in no straight-line passages 126 through the entire porous body 120.

Returning generally to FIG. 1, porous body 120 and/or one or more porous elements 130 may include, and/or may be formed of, an electrically insulating material, which may serve to electrically isolate ignition-risk structure 140 from the bulk 162 of combustible environment 160. Additionally or alternatively, porous body 120 and/or one or more porous elements 130 may include, and/or may be formed of, an electrically conductive material, which may serve as an electromagnetic shield to isolate ignition-risk structure 140. When porous body 120 includes porous elements 130 that are electrically conductive as well as porous elements 130 that are electrically insulating, the net structure may be characterized as being electrically conductive or electrically insulating, and/or may be characterized by a net electrical impedance.

Ignition-quenching cover 110 and/or porous body 120 may have a net shape that is configured to prevent a corona discharge on an external surface of the respective structure (e.g., the distal cover side 114). For instance, the exterior surface of the ignition-quenching cover 110 and/or the porous body 120 may be hemispherical. Additionally or alternatively, the exterior surface may be polished or smoothed to ensure that the exterior surface does not define sharp points or edges that may concentrate an electric field and lead to an electromagnetic discharge.

Porous body 120 and porous elements 130, each independently, may include, and/or may be composed essentially of, a polymer (e.g., polypropylene, polystyrene, polyurethane, ethylene vinyl acetate (EVA), and/or polysulfone), a composite material (e.g., a carbon fiber-reinforced polymer (CFRP) and/or fiberglass), a ceramic, a glass, a non-metal, and/or a metal (e.g., aluminum, steel, and/or titanium).

Ignition-quenching cover 110 may be sized to cover and/or to enclose ignition-risk structure 140 and/or may be installed on or near ignition-risk structure 140. For instance, ignition-quenching cover 110 may be configured to substantially enclose at least a portion of ignition-risk structure 140 that is in contact with combustible environment 160. That is, ignition-quenching cover 110 may be configured such that ignition-risk structure 140 is substantially surrounded by one or both of support structure 150 and/or ignition-quenching cover 110 when ignition-quenching cover 110 is installed on ignition-risk structure 140. Additionally or alternatively, ignition-quenching cover 110 may be sized to cover and/or to enclose more than one ignition-risk structure 140. For example, ignition-quenching cover 110 may be in the form of a porous strip or sheet that may cover a series of ignition-risk structures 140.

When assembled in the ignition-quenching system 100, the ignition-quenching cover 110 and the ignition-risk structure 140 are collocated, with the ignition-quenching cover 110 covering and/or enclosing the ignition-risk structure 140. The ignition-quenching cover 110 is proximate to the ignition-risk structure 140, but not necessarily in contact with the ignition-risk structure 140. Where the proximal cover side 112 does not contact the ignition-risk structure 140, the distance between the proximal cover side 112 and the ignition-risk structure 140 generally is not overwhelmingly larger than the quenching distance of the combustible environment 160. For example, the maximum distance between the proximal cover side 112 and the ignition-risk structure 140 may be less than 100 times, less than 30 times, less than 10 times, less than 3 times, or less than 1 times the quenching distance of the combustible environment 160. The maximum distance between the proximal cover side 112 and the ignition-risk structure 140 may be at most 100 mm, at most 30 mm, at most 10 mm, at most 3 mm, or at most 1 mm.

Ignition-quenching cover 110 may be coupled to ignition-risk structure 140 and/or to support structure 150. For instance, ignition-quenching cover 110 may be affixed to ignition-risk structure 140 and/or to support structure 150 by an adhesive. Additionally or alternatively, ignition-quenching cover 110 may be configured to thread onto, snap onto, and/or mechanically interlock with at least a portion of ignition-risk structure 140. For instance, at least a portion of ignition-quenching cover 110 may be constructed monolithically with at least a portion of ignition-risk structure 140. As an example, ignition-risk structure 140 may be an assembly of a bolt and a nut that is configured to thread onto the bolt. The nut may be integrally formed with ignition-quenching cover 110, such that threading the nut onto the bolt serves to operatively couple ignition-quenching cover 110 to ignition-risk structure 140.

Ignition-quenching cover 110 may be configured to receive and/or to engage ignition-risk structure 140, for instance, with a cavity 116 defined by proximal cover side 112 of ignition-quenching cover 110. Cavity 116 may be referred to as a recess, a concavity, and/or a depression. Cavity 116, when present, may be configured, sized, and/or shaped to receive and/or to engage a portion of ignition-risk structure 140. Cavity 116 may define a cavity volume that may be configured to surround a substantial portion of ignition-risk structure 140 exposed to the combustible environment 160 when the ignition-quenching cover 110 is installed on ignition-risk structure 140. The enclosed volume 164 of the ignition-quenching cover 110 includes the optional cavity volume.

When assembled in the ignition-quenching system 100, the ignition-quenching cover 110 and/or the porous body 120 may be in direct contact with ignition-risk structure 140 and/or support structure 150. For example, at least a portion of proximal cover side 112 and/or cavity 116 may contact ignition-risk structure 140 and/or support structure 150. Additionally or alternatively, at least a portion of porous body 120 may be spaced apart from ignition-risk structure 140 and/or support structure 150. Where the proximal cover side 112 is spaced apart from support structure 150, the proximal cover side 112 and the support structure 150 may define a gap 118 therebetween. The gap 118 may be at least partially filled with a spacer, adhesive, and/or fastener, and may include one or more unfilled regions. When present, the unfilled regions are sized and/or arranged to prevent a nascent flame front and/or a hot particle from propagating around the ignition-quenching cover 110 and potentially igniting the bulk 162 of the combustible environment 160. For example, the unfilled regions of the gap 118 may be smaller than the quenching distance, or related parameter, of the combustible environment 160.

Ignition-risk structure 140 may be coupled to, extend from, and/or protrude from support structure 150 such that at least a portion of ignition-risk structure 140 is in contact with combustible environment 160 when combustible environment 160 is present. As shown in FIG. 1, ignition-risk structure 140 may extend fully through support structure 150 (indicated in dotted line), may terminate within support structure 150, or may be supported by and/or coupled to support structure 150 without penetrating support structure 150 (indicated in solid line).

Ignition-risk structure 140 may join and/or couple support structures 150 together and/or to other structures. Ignition-risk structure 140 may support and/or may be supported by support structure 150. Examples of ignition-risk structures 140 include a fastener, a coupling, a structural joint, a structural edge, a sensor, a wire, a tube, conduit, and/or an enclosure. Ignition-risk structure 140 includes, may be composed essentially of, and/or may be an electrical conductor. Ignition-risk structure 140 may be electrically conductive (e.g., metallic) and may be composed essentially of metal. Additionally or alternatively, ignition-risk structure 140 may include, and/or may be, a poor electrical conductor and/or an electrical insulator (electrically non-conductive).

Ignition-risk structure 140 may be electrically isolated or electrically connected to support structure 150. Support structure 150 generally is non-metallic and may be less electrically conductive than ignition-risk structure 140. Support structure 150 may include and/or may be an electrical insulator (electrically non-conductive) and/or a poor electrical conductor. Support structure 150 may include, and/or may be constructed of, a polymer (e.g., polyurethane), a composite material (e.g., a carbon fiber-reinforced polymer (CFRP) and/or fiberglass), and/or building materials (e.g., wood, masonry, drywall).

As a specific example of ignition-quenching system 100, the ignition-quenching system 100 may be at least a portion of a fuel tank, such as a wing fuel tank in a composite wing aircraft. Ignition-risk structure 140 may be a fastener exposed to the fuel volume (e.g., extending into the interior of the fuel tank) and embedded in and/or coupling one or more support structures 150 which contact the fuel volume. The support structures 150 may be carbon-fiber composite panels, partitions, stringers, etc. that are in the interior of the fuel tank and/or define at least a portion of the interior of the fuel tank. The ignition-quenching cover 110 covers the ignition-risk structure 140 and is collocated with the ignition-risk structure 140. The ignition-quenching cover 110 is porous and permits fuel vapor to contact the ignition-risk structure 140. An ignition source associated with the ignition-risk structure 140 (fastener) may develop and trigger an ignition event at the ignition-risk structure 140. For example, due to, e.g., a lightning strike or the friction of fuel movement, electrical charge and/or an electrical voltage may develop at the ignition-risk structure 140 sufficient to cause an electrical discharge or other potential ignition source. The ignition event includes an ignition kernel, a nascent flame front, and/or a pressure wave within the enclosed volume 164 of the ignition-quenching cover 110. The ignition kernel is quenched by the ignition-quenching cover 110; the nascent flame front is quenched as it traverses the ignition-quenching cover 110; and/or the pressure wave may be dissipated and/or impeded by the ignition-quenching cover 110.

In addition to mitigating the immediate effects of an ignition event, the ignition-quenching cover 110 may be lighter than a conventional cap seal and may permit larger fuel volumes than a conventional cap seal. In particular, aircraft wing fuel tanks may include many hundreds of fasteners which may be protected by ignition-quenching covers 110. A small weight savings in an individual cover may amount to a large net weight savings for the aircraft. Conventional cap seals are not porous and exclude fuel from a volume around each fastener. Ignition-quenching cover 110 is porous and may permit fuel to substantially fill the enclosed volume 164 and/or the interior volume 166 of the ignition-quenching cover 110. The small fuel volume increase associated with each ignition-quenching cover 110 may contribute significantly to the total fuel volume and the efficiency of operation of the aircraft. Further, the resiliency of ignition-quenching covers 110 (generally withstanding ignition sources and/or ignition events without damage) may reduce the amount, frequency, and/or complexity of maintenance and/or inspection of the wing fuel tank as compared to a wing fuel tank incorporating conventional cap seals.

Though the aircraft wing fuel tank example is detailed to explain some potential advantages of use of the ignition-quenching cover 110, the ignition-quenching cover 110 may be utilized and/or incorporated within other examples and/or ignition-quenching systems 100. For example, ignition-quenching cover 110 may be useful in other applications requiring ignition hazard consideration, including fuel transport, fuel storage, mining operations, chemical processing, metal fabrication, power plant construction and operation, and operations which involve combustible particulate such as suspended dust, sawdust, coal, metal, flour, and/or grain.

Ignition-quenching cover 110, and components thereof, may be configured to withstand, and/or to operate at, a wide range of temperatures. Hence, ignition-quenching cover 110 may retain its structural integrity and its ignition-quenching capability when exposed to and/or operating in a high temperature, a low temperature, and/or temperature cycles. Examples of temperature extremes and/or ranges include less than 80° C., less than 60° C., less than 40° C., less than 20° C., less than 0° C., greater than −80° C., greater than −60° C., greater than −40° C., greater than −20° C., and/or greater than 0° C. For example, aircraft may experience temperatures in excess of 40° C. (e.g., while on the tarmac) and below 60° C. (e.g., while at altitude).

Figures 4, 5:
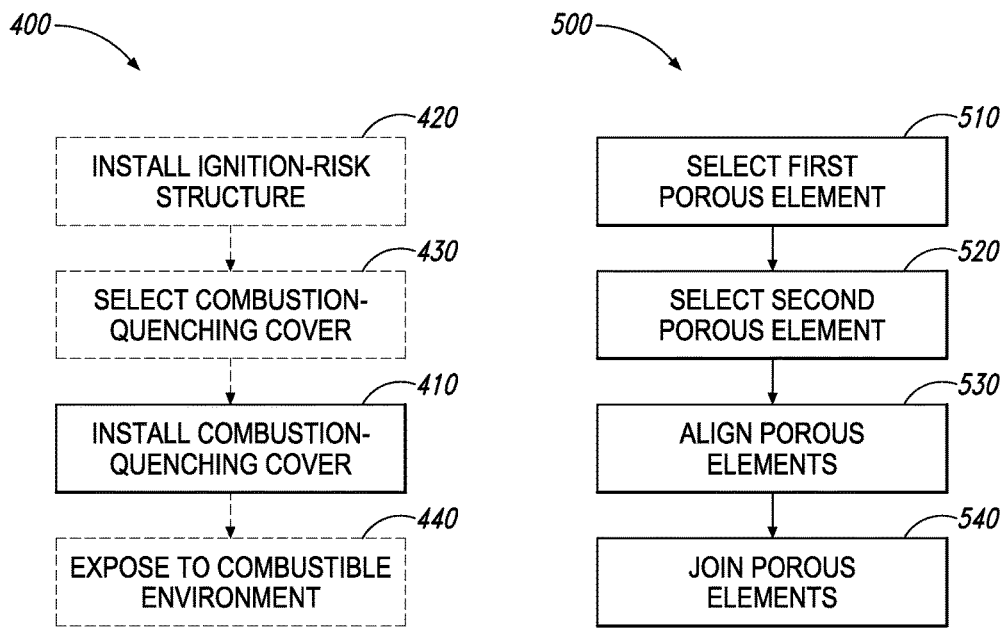
FIG. 4 is a schematic representation of ignition-quenching system manufacturing methods according to the present disclosure.
FIG. 5 is a schematic representation of ignition-quenching cover manufacturing methods according to the present disclosure.

FIG. 4 schematically represents methods 400 of manufacturing, fabricating, forming, and/or assembling an ignition-quenching system (e.g., the ignition-quenching system 100). Methods 400 may be methods of preventing bulk combustion of a combustible environment (e.g., the combustible environment 160) due to an ignition source associated with an ignition-risk structure (e.g., the ignition-risk structure 140). Methods 400 may be methods of protecting a fuel tank from ignition events associated with an ignition-risk structure within the fuel tank.

Methods 400 include installing 410 a porous ignition-quenching cover (e.g., the ignition-quenching cover 110) over a portion of the ignition-risk structure that is configured to be exposed to the combustible environment. Installing 410 may include at least partially enclosing the portion of the ignition-risk structure with the porous ignition-quenching cover. Methods 400 may be methods of installing the ignition-quenching cover over a fastener in a fuel tank.

The ignition-risk structure may be coupled to and/or may extend from a support structure (e.g., the support structure 150). Installing 410 may include affixing and/or coupling the porous ignition-quenching cover directly to the ignition-risk structure and/or the support structure. For example, installing 410 may include adhering and/or bonding (e.g., with adhesive) the porous ignition-quenching cover to the ignition-risk structure and/or the support structure. Further, installing 410 may include threading, snapping, and/or mechanically interlocking the ignition-quenching cover onto the ignition-risk structure and/or the support structure. Installing 410 may include coupling the porous ignition-quenching cover in direct contact with the ignition-risk structure and/or the support structure. Installing 410 may include coupling the porous ignition-quenching cover such that the porous ignition-quenching cover is spaced away from at least one of the ignition-risk structure and the support structure. Installing 410 may include coupling the porous ignition-quenching cover to form a gap between the porous ignition-quenching cover and at least one of the ignition-risk structure and the support structure.

Installing 410 the porous ignition-quenching cover may include integrally forming, unifying, and/or assembling the ignition-quenching cover with at least a portion of the ignition-risk structure. For example, where the ignition-risk structure includes a bolt and a nut, installing 410 may include unifying the ignition-quenching cover with the nut and assembling the nut onto the bolt.

Installing 410 the porous ignition-quenching cover may include repairing, replacing, and/or retrofitting a cover over the ignition-risk structure. For example, installing 410 may include removing a preexisting cover from the ignition-risk structure, preparing the ignition-risk structure to receive and/or to engage the porous ignition-quenching cover, and installing the ignition-quenching cover on the prepared ignition-risk structure.

Methods 400 may include installing 420 the ignition-risk structure onto and/or into a support structure (e.g., the support structure 150). Installing 420 may include installing the ignition-risk structure in a volume that is configured to at least partially enclose the combustible environment (e.g., within a fuel tank). Further, installing 420 may include exposing at least a portion of the ignition-risk structure (e.g., a portion of the ignition-risk structure that is configured to be exposed to the combustible environment) to the volume.

Methods 400 may include selecting 430 a porous ignition-quenching cover suitable to prevent an ignition event originating at the ignition-risk structure from propagating through the porous ignition-quenching cover and igniting the bulk of the combustible environment (e.g., selecting, configuring, adapting, and/or fabricating the ignition-quenching cover 110).

Methods 400 may include exposing 440 the ignition-risk structure and the porous ignition-quenching cover installed over the ignition-risk structure to the combustible environment. For example, exposing 440 may include at least partially filling with fuel a fuel tank that includes the ignition-risk structure and the porous ignition-quenching cover.

FIG. 5 schematically represents methods 500 of manufacturing, fabricating, forming, and/or assembling a porous body (e.g., the porous body 120) of a porous ignition-quenching cover (e.g., the ignition-quenching cover 110).

Methods 500 include selecting 510 a first porous element (e.g., porous element 130), selecting 520 a second porous element (e.g., porous element 130), aligning 530 the first porous element and the second porous element to form an aligned group of porous elements, and joining 540 the aligned group of porous elements to form at least a portion of the porous body of the ignition-quenching cover. The first porous element and the second porous element have a respective plurality of passages (e.g., passages 126) through the respective porous element. The first plurality of passages and the second plurality of passages have a respective average effective diameter and a respective passage orientation (e.g., passage orientation 132).

Aligning 530 the first porous element and the second porous element includes orienting the passage orientation of the first porous element differently than the passage orientation of the second porous element. Aligning 530 may include positioning the first porous element and/or the second porous element to form passages (e.g., passages 126) through the porous body. The first porous element and the second porous element may have substantially the same characteristics, e.g., one or more of materials, exterior dimensions, exterior shape, size of passages, size of pores, orientation of passages (e.g., relative to the exterior shape), spacing of passages, and/or density of passages. Additionally or alternatively, the first porous element and the second porous element may have one or more distinct and/or different characteristics. Aligning 530 may include positioning the first porous element and/or the second porous element to mis-register and/or misalign the first plurality of passages and the second plurality of passages, and/or a characteristic of the first porous element and the second porous element. Aligning 530 may include positioning (e.g., by relative rotation and/or translation) the first porous element and the second porous element to eliminate any straight-line path through the aligned group of porous elements (and/or in the porous body) with an effective diameter greater than a predetermined threshold such as 1 mm, 0.3 mm, 0.1 mm, 0.03 mm, or 0.01 mm.

Joining 540 the aligned group of porous elements may include adhering, bonding, welding, sintering, fastening, and/or coupling the first porous element and the second porous element together.

Examples of inventive subject matter according to the present disclosure are described in the following enumerated paragraphs.

A1. An ignition-quenching cover configured to quench an ignition event in a combustible environment triggered by an ignition source associated with an ignition-risk structure, the ignition-quenching cover comprising:

a porous body;

wherein the ignition-quenching cover is configured to cover an ignition-risk structure, wherein the ignition-risk structure is associated with a potential ignition source that may produce an ignition event in a combustible environment, and wherein the porous body defines passages sized to quench the ignition event.

A2. The ignition-quenching cover of paragraph A1, wherein the porous body defines a cavity that is configured, sized, and/or shaped to receive the ignition-risk structure.

A3. The ignition-quenching cover of any of paragraphs A1-A2, wherein the ignition source that is at least one of an electrical arc, a hot surface, a hot particle ejection, and an electrostatic discharge.

A4. The ignition-quenching cover of any of paragraphs A1-A3, wherein the ignition source is associated with a buildup of heat and/or electrical charge in the ignition-risk structure.

A5. The ignition-quenching cover of any of paragraphs A1-A4, wherein the ignition-quenching cover is configured to dissipate and/or impede a pressure wave associated with the ignition event.

A6. The ignition-quenching cover of any of paragraphs A1-A5, wherein the ignition-quenching cover is configured to permit a pressure wave associated with the ignition event to travel through the porous body.

A7. The ignition-quenching cover of any of paragraphs A1-A6, wherein the ignition-risk structure is an electrically conductive structure.

A8. The ignition-quenching cover of any of paragraphs A1-A7, wherein the ignition-risk structure is at least one of a fastener, a coupling, a joint, an edge, a sensor, a wire, a tube, a conduit, and an enclosure.

A9. The ignition-quenching cover of any of paragraphs A1-A8, wherein the ignition-risk structure is configured to withstand contact with the combustible environment.

A10. The ignition-quenching cover of any of paragraphs A1-A9, wherein the ignition-risk structure is chemically resistant to the combustible environment.

A11. The ignition-quenching cover of any of paragraphs A1-A10, wherein the ignition-quenching cover is configured to be installed in a fuel tank, optionally a wing fuel tank of an aircraft.

A12. The ignition-quenching cover of any of paragraphs A1-A11, wherein the ignition-quenching cover is configured to withstand a temperature of less than 80° C., less than 60° C., less than 40° C., less than 20° C., less than 0° C., greater than −80° C., greater than −60° C., greater than −40° C., greater than −20° C., and/or greater than 0° C.

A13. The ignition-quenching cover of any of paragraphs A1-A12, wherein the ignition-quenching cover is porous to, chemically resistant to, and/or chemically nonreactive with the combustible environment.

A14. The ignition-quenching cover of any of paragraphs A1-A13, wherein the combustible environment includes one or more of a fuel and an oxidizer, and optionally wherein the fuel includes at least one of hydrogen, gaseous hydrocarbon, aerosolized hydrocarbon, liquid hydrocarbon, and suspended particulate.

A15. The ignition-quenching cover of any of paragraphs A1-A14, wherein the combustible environment includes at least one of a gas, an aerosol, and a vapor.

A16. The ignition-quenching cover of any of paragraphs A1-A15, wherein the porous body is a multicomponent and/or multilayer porous body that includes at least two porous elements, and optionally wherein a passage orientation of at least one of the at least two porous elements is different than a passage orientation of at least another of the at least two porous elements.

A17. The ignition-quenching cover of any of paragraphs A1-A16, wherein the porous body includes, and optionally is, one or more (optionally two or more) porous elements, and optionally wherein each porous element is independently selected from the group consisting of a reticulated lattice, a reticulated foam, and an open-cell foam.

A18. The ignition-quenching cover of any of paragraphs A1-A17, wherein the porous body and/or any included porous elements has a mass density of at most 2 g/cc, at most 1 g/cc, at most 0.5 g/cc, at most 0.2 g/cc, at most 0.1 g/cc, at most 0.05 g/cc, at most 0.02 g/cc, or at most 0.01 g/cc.

A19. The ignition-quenching cover of any of paragraphs A1-A18, wherein the porous body and/or at least one, optionally each, included porous element has a porosity of at least 50%, at least 75%, at least 85%, at least 90%, at least 95%, or at least 98%.

A20. The ignition-quenching cover of any of paragraphs A1-A19, wherein the porous body and/or at least one, optionally each, included porous element has an average effective pore diameter and/or an average effective passage diameter that is less than or equal to a quenching distance of the combustible environment.

A21. The ignition-quenching cover of any of paragraphs A1-A20, wherein the porous body and/or at least one, optionally each, included porous element has an average effective pore diameter and/or average effective passage diameter that is at least 0.1 mm, at least 0.2 mm, at least 0.5 mm, at least 1 mm, at least 2 mm, at least 3 mm, at most 10 mm, at most 3 mm, at most 1 mm, at most 0.3 mm, and/or at most 0.1 mm.

A22. The ignition-quenching cover of any of paragraphs A1-A21, wherein the porous body and/or at least one, optionally each, included porous element includes struts that define a reticulated lattice, optionally wherein one or more, and optionally all, of the struts are hollow struts and/or hollow tubes.

A22.1. The ignition-quenching cover of paragraph A22, wherein the struts have a diameter that is at most 75%, at most 50%, at most 25%, at most 10%, and/or at most 5% of an average effective pore diameter and/or an average effective passage diameter.

A22.2. The ignition-quenching cover of any of paragraphs A22-A22.1, wherein the hollow struts and/or the hollow tubes contain a flame-suppressing substance, optionally a haloalkane.

A23. The ignition-quenching cover of any of paragraphs A1-A22.2, wherein the porous body and/or at least one, optionally each, included porous element includes, and/or is composed essentially of, one or more of polypropylene, polystyrene, polyurethane, ethylene vinyl acetate, polysulfone, a composite material, a carbon fiber-reinforced polymer, fiberglass, a ceramic, a glass, a non-metal, a metal, aluminum, steel, and titanium.

A24. The ignition-quenching cover of any of paragraphs A1-A23, wherein the porous body and/or at least one, optionally each, included porous element is electrically conductive or electrically insulating.

A25. The ignition-quenching cover of any of paragraphs A1-A24, wherein the porous body and/or at least one, optionally each, included porous element has a volumetric specific heat capacity that is at least 10 times, at least 100 times, or at least 1,000 times a volumetric specific heat capacity of the combustible environment.

A26. The ignition-quenching cover of any of paragraphs A1-A25, wherein the porous body and/or at least one, optionally each, included porous element has a total heat capacity that is at least 3 times, at least 10 times, or at least 30 times a total heat capacity of the combustible environment within a volume defined by the porous body.

A27. The ignition-quenching cover of any of paragraphs A1-A26, wherein the porous body and/or at least one, optionally each, included porous element has a thermal conductivity that is at least 5 times, at least 10 times, at least 100 times, or at least 1,000 times a thermal conductivity of the combustible environment.

A28. The ignition-quenching cover of any of paragraphs A1-A27, wherein the porous body and/or at least one, optionally each, included porous element is configured to prevent a hot particle of greater than a predetermined size associated with an ignition source from passing through the porous body.

A29. The ignition-quenching cover of any of paragraphs A1-A28, wherein the porous body has a shape that is configured to avoid a corona discharge at an exterior surface of the ignition-quenching cover.

B1. An ignition-quenching system for preventing bulk combustion in a combustible environment by an ignition source associated with an ignition-risk structure, the ignition-quenching system comprising:
 a support structure that is in contact with a combustible environment;
 an ignition-risk structure that extends and/or protrudes from the support structure into the combustible environment; and a porous ignition-quenching cover that substantially covers the ignition-risk structure and that is coupled to the support structure, wherein the porous ignition-quenching cover is configured to quench an ignition event in the combustible environment triggered by an ignition source associated with the ignition-risk structure.

B2. The ignition-quenching system of paragraph B1, wherein the porous ignition-quenching cover is the ignition-quenching cover of any of paragraphs A1-A29.

B3. The ignition-quenching system of any of paragraphs B1-B2, wherein the porous ignition-quenching cover is collocated with the ignition-risk structure.

B4. The ignition-quenching system of any of paragraphs B1-B3, wherein the porous ignition-quenching cover substantially encloses at least a portion of the ignition-risk structure that is in contact with the combustible environment.

B5. The ignition-quenching system of any of paragraphs B1-B4, wherein the ignition-risk structure is coupled to the support structure.

B6. The ignition-quenching system of any of paragraphs B1-B5, wherein the porous ignition-quenching cover is directly coupled to the support structure.

B7. The ignition-quenching system of any of paragraphs B1-B6, wherein the porous ignition-quenching cover is affixed to the support structure, optionally with an adhesive.

B8. The ignition-quenching system of any of paragraphs B1-B7, wherein the porous ignition-quenching cover is spaced apart from the support structure, optionally by a distance that is less than a quenching distance of the combustible environment.

B9. The ignition-quenching system of any of paragraphs B1-B8, wherein the porous ignition-quenching cover is coupled to the ignition-risk structure.

B10. The ignition-quenching system of any of paragraphs B1-B9, wherein the porous ignition-quenching cover is threaded onto, snapped onto, and/or mechanically interlocked with the ignition-risk structure.

B11. The ignition-quenching system of any of paragraphs B1-B10, wherein the porous ignition-quenching cover is affixed to the ignition-risk structure, optionally with an adhesive.

B12. The ignition-quenching system of any of paragraphs B1-B11, wherein the porous ignition-quenching cover is integrally formed with at least a portion of the ignition-risk structure.

B13. The ignition-quenching system of any of paragraphs B1-B12, wherein the porous ignition-quenching cover is spaced apart from the ignition-risk structure.

C1. A method of preventing bulk combustion of a combustible environment by an ignition source associated with an ignition-risk structure, the method comprising:

installing a porous ignition-quenching cover over an ignition-risk structure, wherein the installing the porous ignition-quenching cover includes at least partially enclosing the ignition-risk structure;

wherein the porous ignition-quenching cover is configured to quench an ignition event triggered by an ignition source associated with the ignition-risk structure.

C2. The method of paragraph C1, wherein the porous ignition-quenching cover is the ignition-quenching cover of any of paragraphs A1-A29, and optionally wherein the method comprises selecting the ignition-quenching cover.

C3. The method of any of paragraphs C1-C2, further comprising installing the ignition-risk structure in a volume that is configured to at least partially enclose the combustible environment, and optionally wherein the installing the ignition-risk structure includes exposing the ignition-risk structure to the volume.

C4. The method of any of paragraphs C1-C3, wherein the installing the porous ignition-quenching cover includes at least one of affixing and coupling the porous ignition-quenching cover, optionally directly, to the ignition-risk structure.

C4.1. The method of paragraph C4, wherein the installing the porous ignition-quenching cover includes adhering the porous ignition-quenching cover to the ignition-risk structure, optionally with an adhesive.

C5. The method of any of paragraphs C1-C4.1, wherein the installing the porous ignition-quenching cover includes at least one of affixing and coupling the porous ignition-quenching cover, optionally directly, to a support structure from which the ignition-risk structure extends and/or protrudes.

C5.1. The method of paragraph C5, wherein the installing the porous ignition-quenching cover includes adhering the porous ignition-quenching cover to the support structure, optionally with an adhesive.

C6. The method of any of paragraphs C1-C5.1, wherein the installing the porous ignition-quenching cover includes installing the porous ignition-quenching cover in a fuel tank, optionally an aircraft fuel tank.

C7. The method of any of paragraphs C1-C6, wherein the installing the porous ignition-quenching cover includes retrofitting the ignition-risk structure to include the ignition-quenching cover by removing a preexisting cover from the ignition-risk structure, preparing the ignition-risk structure to receive the porous ignition-quenching cover, and installing the ignition-quenching cover on the ignition-risk structure.

C8. The method of any of paragraphs C1-C7, further comprising exposing the ignition-risk structure and the porous ignition-quenching cover installed over the ignition-risk structure to the combustible environment.

C9. The method of any of paragraphs C1-C8, wherein the combustible environment is the combustible environment of any of paragraphs A1-A29.

C10. The method of any of paragraphs C1-C9, wherein the installing the porous ignition-quenching cover includes installing the porous ignition-quenching cover over a portion of the ignition-risk structure that is configured to be exposed to a combustible environment.

D1. A method of assembling a porous body of an ignition-quenching cover, the method comprising:

selecting a first porous element with a first plurality of passages through the first porous element, wherein the first plurality of passages has a first average effective diameter and a first passage orientation;

selecting a second porous element with a second plurality of passages through the second porous element, wherein the second plurality of passages has a second average effective diameter and a second passage orientation;

aligning the first porous element and the second porous element to form an aligned group of porous elements, wherein the aligning includes orienting the first passage orientation differently than the second passage orientation; and joining the aligned group of porous elements to form a porous body of an ignition-quenching cover.

D2. The method of paragraph D1, wherein the porous body is the porous body of any of paragraphs A1-A29.

D3. The method of any of paragraphs D1-D2, wherein the ignition-quenching cover is the ignition-quenching cover of any of paragraphs A1-A29.

D4. The method of any of paragraphs D1-D3, wherein the first average effective diameter and the second average effective diameter are approximately equal.

D5. The method of any of paragraphs D1-D4, wherein the aligning includes positioning the first porous element and the second porous element to eliminate any straight-line path through the aligned group of porous elements with an effective diameter greater than a predetermined threshold such as 1 mm, 0.3 mm, 0.1 mm, 0.03 mm, or 0.01 mm.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function. Further, as used herein, the singular forms "a," "an," and "the" may be intended to include the plural forms as well, unless the context clearly indicates otherwise.

The various disclosed elements of systems and apparatuses, and steps of methods disclosed herein are not required of all systems, apparatuses, and methods according to the present disclosure, and the present disclosure includes all novel and non-obvious combinations and subcombinations of the various elements and steps disclosed herein. Moreover, any of the various elements and steps, or any combination of the various elements and/or steps, disclosed herein may define independent inventive subject matter that is separate and apart from the whole of a disclosed system, apparatus, or method. Accordingly, such inventive subject matter is not required to be associated with the specific systems, apparatuses and methods that are expressly disclosed herein, and such inventive subject matter may find utility in systems and/or methods that are not expressly disclosed herein.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/ or methods, are also within the scope of the present disclosure.

As used herein, the phrases "at least one of" and "one or more of," in reference to a list of more than one entity, means any one or more of the entities in the list of entities, and is not limited to at least one of each and every entity specifically listed within the list of entities. For example, "at least one of A and B" (or, equivalently, "at least one of A or B," or, equivalently, "at least one of A and/or B") may refer to A alone, B alone, or the combination of A and B.

The invention claimed is:

1. An ignition-quenching system for preventing bulk combustion in a combustible environment, the ignition-quenching system comprising:
   a fuel tank having an interior;
   liquid fuel and fuel vapor housed within the interior of the fuel tank;
   an electrically conductive fastener that extends from the fuel tank into the interior of the fuel tank; and
   a porous ignition-quenching cover that includes a porous body, wherein the porous ignition-quenching cover substantially covers the electrically conductive fastener within the interior of the fuel tank and is coupled to the fuel tank, wherein the porous body defines pores or passages that are sized to quench an ignition event in the interior of the fuel tank triggered by an ignition source associated with the electrically conductive fastener;
   wherein the porous ignition-quenching cover is at least one of threaded onto, snapped onto, and adhered to the electrically conductive fastener.

2. The ignition-quenching system of claim 1, wherein the porous body includes one or more porous elements.

3. The ignition-quenching system of claim 2, wherein each porous element is independently selected from the group consisting of a reticulated lattice, a reticulated foam, and an open-cell foam.

4. The ignition-quenching system of claim 1, wherein the porous body has an average effective passage diameter that is less than or equal to a quenching distance of the fuel vapor.

5. The ignition-quenching system of claim 1, wherein the porous ignition-quenching cover substantially encloses a portion of the electrically conductive fastener that is in contact with the liquid fuel or the fuel vapor.

6. The ignition-quenching system of claim 1, wherein the porous body defines a cavity that is configured to receive the electrically conductive fastener.

7. The ignition-quenching system of claim 1, wherein the fuel tank is electrically non-conductive and includes a composite material.

8. The ignition-quenching system of claim 1, wherein the porous ignition-quenching cover is porous to and chemically resistant to the liquid fuel and the fuel vapor.

9. The ignition-quenching system of claim 1, wherein the ignition source is at least one of an electrical arc, a hot surface, a hot particle ejection, and an electrostatic discharge.

10. The ignition-quenching system of claim 1, wherein the ignition source is associated with a buildup of heat and/or electrical charge in the electrically conductive fastener.

11. The ignition-quenching system of claim 1, wherein the porous ignition-quenching cover is configured to dissipate and/or impede a pressure wave associated with the ignition event.

12. The ignition-quenching system of claim 1, wherein the porous ignition-quenching cover is configured to permit a pressure wave associated with the ignition event to travel through the porous body.

13. The ignition-quenching system of claim 1, wherein the electrically conductive fastener is chemically resistant to the liquid fuel and the fuel vapor.

14. The ignition-quenching system of claim 1, wherein the porous ignition-quenching cover is configured to withstand a temperature of less than 60° C. and greater than 40° C.

15. The ignition-quenching system of claim 1, wherein the porous ignition-quenching cover is chemically resistant to and/or chemically nonreactive with the liquid fuel and the fuel vapor.

16. The ignition-quenching system of claim 1, wherein the porous body is a multicomponent and/or multilayer porous body that includes at least two porous elements, and wherein a passage orientation of at least one of the at least two porous elements is different than a passage orientation of at least another of the at least two porous elements.

17. The ignition-quenching system of claim 1, wherein the porous body has a mass density of at most 2 g/cc.

18. The ignition-quenching system of claim 1, wherein the porous body has a porosity of at least 50%.

19. The ignition-quenching system of claim 1, wherein the porous body has an average effective pore diameter that is at least 0.1 mm and at most 10 mm.

20. The ignition-quenching system of claim 1, wherein the porous body includes struts that define a reticulated lattice.

21. The ignition-quenching system of claim 20, wherein the struts have a diameter that is at most 75% of an average effective pore diameter of the porous body.

22. The ignition-quenching system of claim 20, wherein the struts are hollow struts and contain a flame-suppressing substance.

23. The ignition-quenching system of claim 1, wherein the porous body is composed essentially of one or more of polypropylene, polystyrene, polyurethane, ethylene vinyl acetate, polysulfone, a composite material, a carbon fiber-reinforced polymer, fiberglass, a ceramic, a glass, a non-metal, a metal, aluminum, steel, and titanium.

24. The ignition-quenching system of claim 1, wherein the porous body has a volumetric specific heat capacity that is at least 10 times a volumetric specific heat capacity of the fuel vapor.

25. The ignition-quenching system of claim 1, wherein the porous body has a total heat capacity that is at least 3 times a total heat capacity of the fuel vapor within a volume defined by the porous body.

26. The ignition-quenching system of claim 1, wherein the porous body has a thermal conductivity that is at least 5 times a thermal conductivity of the fuel vapor.

27. The ignition-quenching system of claim 1, wherein the porous body is configured to prevent a hot particle of greater than a predetermined size associated with the ignition source from passing through the porous body.

28. The ignition-quenching system of claim 1, wherein the porous body has a shape that is configured to avoid a corona discharge at an exterior surface of the porous ignition-quenching cover.

29. The ignition-quenching system of claim 1, wherein the porous ignition-quenching cover is collocated with the electrically conductive fastener.

30. The ignition-quenching system of claim 1, wherein the porous ignition-quenching cover substantially encloses at least a portion of the electrically conductive fastener that is in contact with the fuel vapor.

31. The ignition-quenching system of claim 1, wherein the porous ignition-quenching cover is spaced apart from the fuel tank by a distance that is less than a quenching distance of the fuel vapor.

32. The ignition-quenching system of claim 1, wherein the fuel tank is an aircraft fuel tank.

\* \* \* \* \*